July 18, 1933.  J. S. REID  1,918,561
GLASS RUN CHANNEL
Filed March 21, 1931
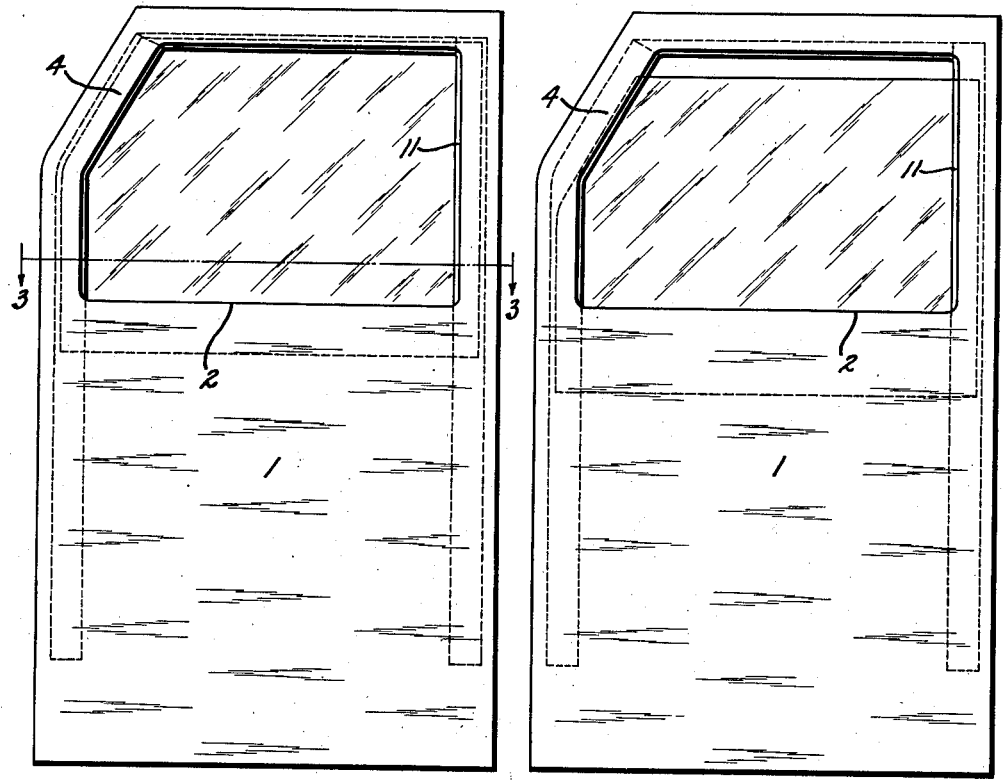
Fig. 1  Fig. 2
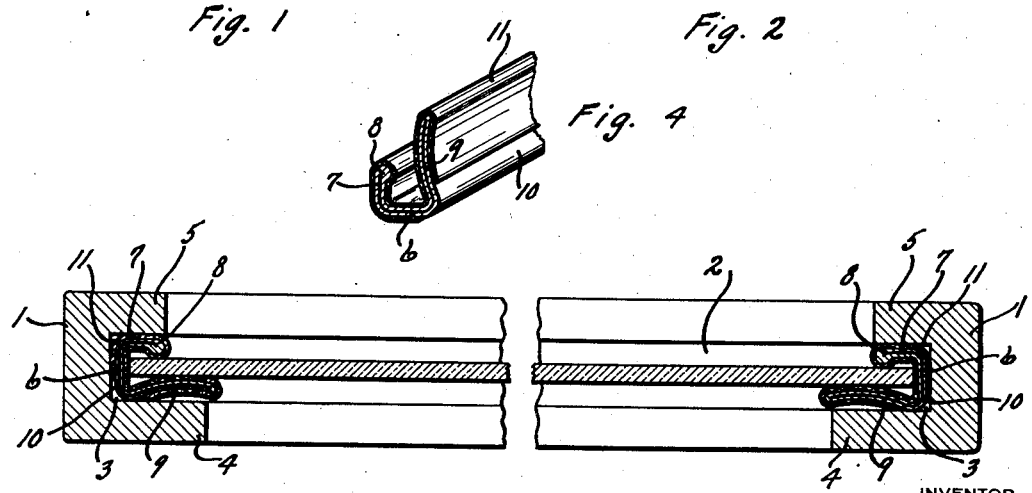
Fig. 4
Fig. 3
INVENTOR
James S. Reid
BY
Brockett, Hyde, Higley & Meyer
ATTORNEYS Patented July 18, 1933

1,918,561

UNITED STATES PATENT OFFICE

JAMES S. REID, OF SHAKER HEIGHTS, OHIO, ASSIGNOR TO THE REID PRODUCTS COMPANY, OF CLEVELAND, OHIO, A CORPORATION OF OHIO

GLASS RUN CHANNEL

Application filed March 21, 1931. Serial No. 524,318.

The invention disclosed in this application relates to glass run channel and is particularly adaptable to the sliding windows of motor vehicles.

In some types of cars, the window openings are curved or are angled off at the upper corners and where they are angled off particularly, difficulty is experienced, when the windows are cracked or opened slightly for ventilation, by the window glass vibrating back and forth and producing a rattle. This is due somewhat to the shallowness of the glass run channel placed in the window grooves of the window frame. It is the object of this invention, therefore, to overcome this disadvantage or to partly correct it by providing a glass run channel having a relatively wide or deep yielding flange or side wall on one side, as for example the outside, to permit a considerable cracking of the window without forming a gap along the angled off edge. This wide channel flange or side wall also greatly assists in the sealing of the window and the dampening of the rattle thereof at other places than at the cut-off corner.

The invention is fully illustrated in the following description, drawing and claims.

Referring to the drawing, Fig. 1 is a side view of an automobile door provided with a window opening having a corner cut off, so to speak; Fig. 2 is a similar view thereof with the window slightly open; Fig. 3 is a cross section of said door upon the line 3—3 of Fig. 1; and Fig. 4 is a perspective cross sectional view of a portion of the present channel.

In the arrangement shown, 1 represents the door of a motor vehicle having a window opening 2. The framework about this window opening is provided with the usual window groove 3, which has a rather long side wall, as at 4, extending beyond the other side wall 5, which may be and preferably is the inner side wall.

The channel here shown is of the spring metal core type with a soft covering and in the present embodiment, 6 represents the core base, 7 the narrow flange or side wall provided with an inwardly extending lip or projection 8, and 9 represents the wide or deep flange or side wall transversely curved inwardly toward the other flange or side wall 7, as shown. The entire channel core is encased in a soft rubber casing 10 and on the outside of this casing is a covering 11 of felt or the like. The wide flange or side wall of the channel is adapted to lie alongside and engage the wider or deeper side wall 4 of the window frame groove, which groove side wall is the outer side wall, and in the embodiment here shown, said channel side wall extends slightly beyond the outer edge of the side wall 4 of the window frame groove, said wide channel flange or side wall being bent inwardly sufficiently to create an inward tension on the window glass when said glass is cracked or opened slightly and inasmuch as said wide or deep channel flange or side wall possesses considerable width or depth, it will continue to engage the battered-off corner of the window glass even after said glass is slightly opened or cracked. This type of channel may be used to advantage also with window openings having curved upper corners.

Having described my invention, I claim:

1. A glass run channel, comprising a generally channel-shaped glass-receiving structure having a base and a pair of glass-engaging side walls, one of said side walls having a width or depth materially greater than that of said other side wall and said wider or deeper side wall being transversely curved inwardly toward said other side wall.

2. A glass run channel, comprising a generally channel-shaped glass-receiving structure having a base and a pair of glass-engaging side walls, one of said side walls having a width or depth materially greater than that of said other side wall and said wider or deeper side wall throughout substantially its entire length being transversely curved inwardly toward said other side wall which is provided at its outer edge and throughout substantially its entire length with a glass-engaging projection extending inwardly toward said wider or deeper side wall.

3. The combination with a window opening and a surrounding window frame, said opening having an angularly shaped upper corner and said frame having a window groove provided with an outer side wall having a width or depth materially greater than that of the inner side wall thereof, of glass-receiving channel in said groove, said channel having a base and a pair of glass-engaging side walls of differing width or depth, one of said channel side walls being adapted to lie alongside of and engage the outer side wall of said groove and having a width or depth corresponding to that of said groove outer side wall and the other side wall of said channel being adapted to lie alongside of and engage the inner side wall of said groove and having a width or depth corresponding to that of said groove inner side wall.

4. The combination with a window opening and a surrounding window frame, said opening having an angularly shaped upper corner and said frame having a window groove provided with an outer side wall having a width or depth materially greater than that of the inner side wall thereof, of a glass-receiving channel in said groove, said channel having a base and a pair of glass-engaging side walls of differing width or depth, one of said channel side walls being adapted to lie alongside of and engage the outer side wall of said groove and having a width or depth corresponding to that of said groove outer side wall and the other side wall of said channel being adapted to lie alongside of and engage the inner side wall of said groove and having a width or depth corresponding to that of said groove inner side wall, the channel side wall adapted for engagement with the outer side wall of said groove, which channel side wall is the one of greater width or depth, being transversely curved inwardly, throughout substantially its entire length, toward said other channel side wall.

JAMES S. REID.